Patented Oct. 13, 1942

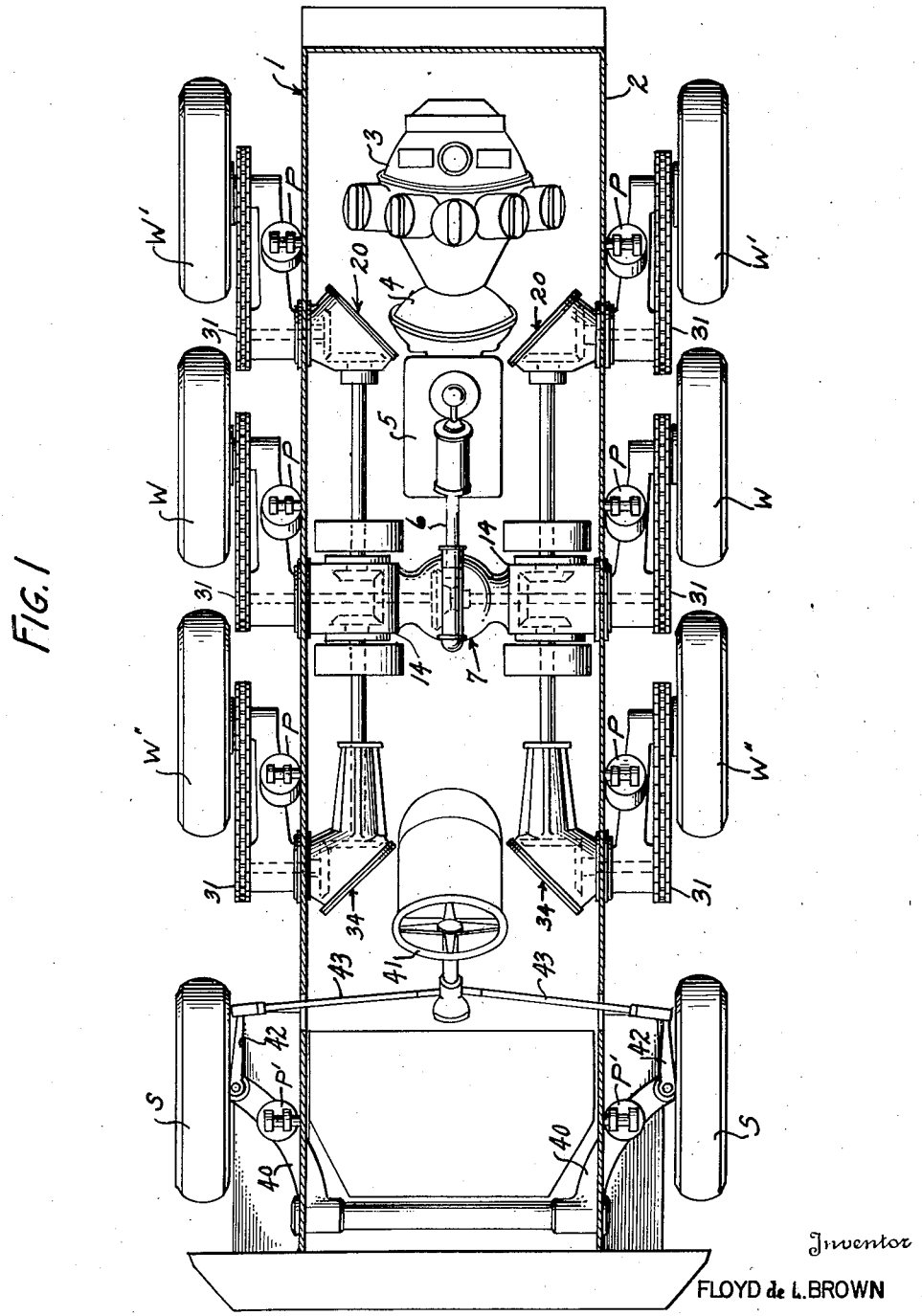

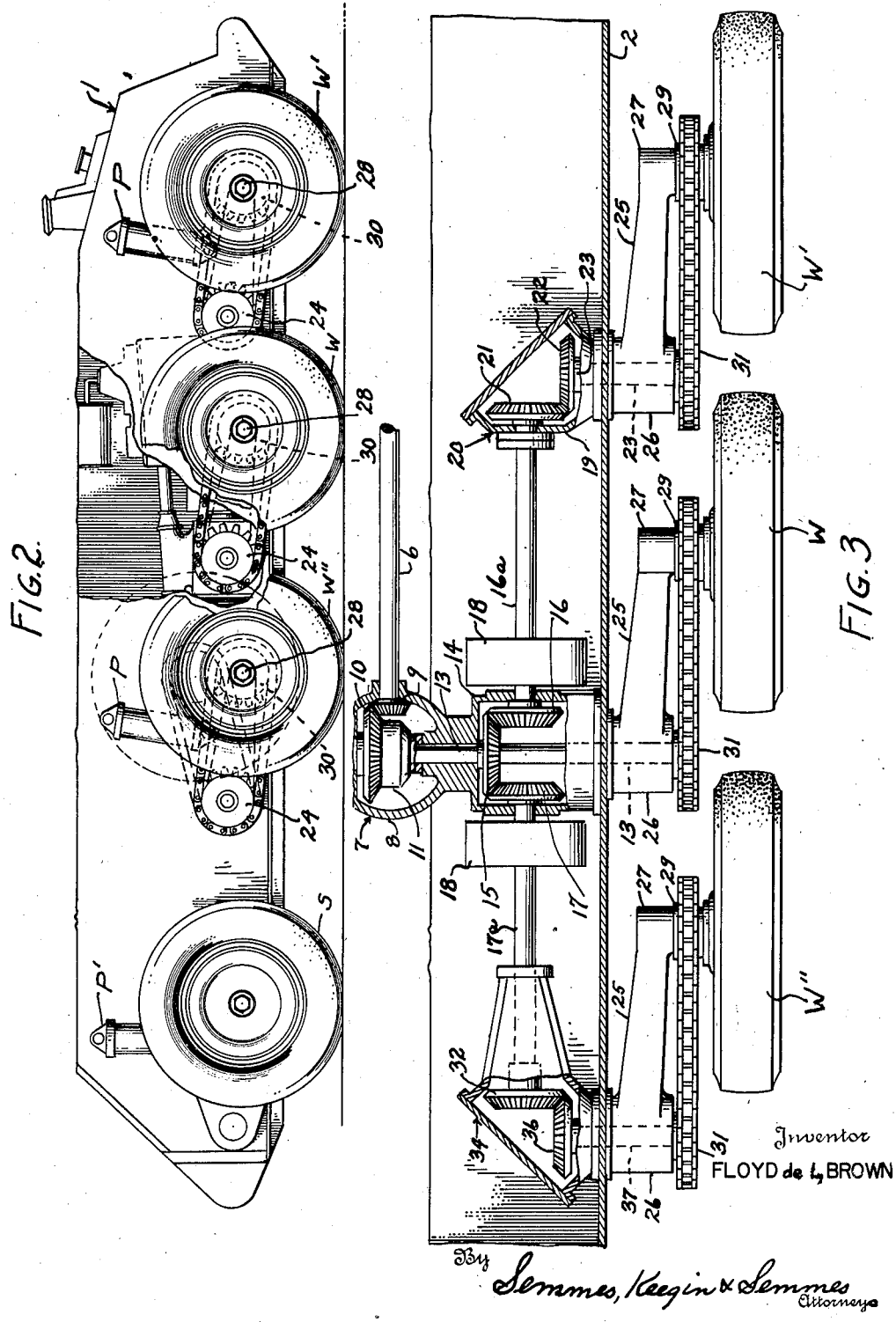

2,299,006

UNITED STATES PATENT OFFICE 2,299,006

AUTOMOTIVE VEHICLE

Floyd de L. Brown, New York, N. Y.

Application June 5, 1939, Serial No. 277,553

5 Claims. (Cl. 180—22)

The present invention relates to a mobile unit supported by a plurality of wheel assemblies, and more particularly to a new and useful mechanized driving assembly for the mobile unit.

An object of the present invention is to provide a single drive mechanism to effectively operate a plurality of pairs of wheels of the mobile unit.

Another object is to provide a pair of directly driven wheels driven by differentially driven shafts and one or more pairs of auxiliary wheels driven through bevel gear assemblies receiving motion translated from the said differentially driven shafts.

Another object is to provide an efficient gear drive for a tractor, or the like, to effectively translate rotary motion to one or more pairs of auxiliary ground engaging wheels in spaced apart relation one to the other and supporting the said tractor.

Still another object is to provide a driving assembly for a tractor, or the like, which permits increased driving and stability features without a corresponding increase in the percentage of tractor weight devoted to additional or large power mechanisms.

Yet another object is to provide a fast, lightweight tractor, or the like, having one or more pairs of auxiliary wheels driven by a single power means through a novel arrangement of gearing.

It is the general concept of this invention to provide a novel driving mechanism for a mobile unit in which rotary motion is translated from a drive shaft operated by a single power means to a plurality of wheels through an efficient and inexpensive gear assembly.

In the drawings wherein like numerals refer to like or corresponding parts throughout the several views:

Figure 1 is a top plan of a tractor, or the like, partly in section, and embodying the principal features of this invention, Figure 2 is a side elevation of a tractor, or the like, with parts broken away, and Figure 3 is a partial horizontal sectional view somewhat enlarged and depicting the gearing embodied in this invention.

Referring now to the drawings, the numeral 1 generally indicates a mobile unit, comprising frame 2, power unit 3, clutch 4, transmission 5, drive-shaft 6 and a differential gear, generally indicated as 7. The above mentioned power unit, clutch and transmission and their operation are known in the art in varying modifications and inasmuch as they do not constitute in themselves a part of this invention it is not thought necessary to describe each in detail.

For purposes of illustration, only the gearing on one side of the mobile unit 1 will be described, it of course being understood, that the gearing on directly opposite sides of the frame 2 are the same and bear the same numerals.

As best shown in Figure 3, the gear 7 comprises a housing 8 which is suspended in the frame 2. Mounted in the housing 8 are a plurality of bevel gears, 9, 10, and differential gear case 11 which constitute the conventional differential driving mechanism for the oppositely disposed shafts 13. The bevel pinion 9 is mounted on the end of the drive shaft 6 and meshes with the bevel gear 10 to rotate the differential case 11.

The directly driven shaft 13 which is journaled in the housing 8, extends outwardly therefrom at substantially right angles to the longitudinal axis of the drive-shaft 6. The shaft 13 extends through a housing 14 and is suitably journaled in a side wall of the frame 2 and has the outer end thereof projecting laterally therefrom to support a wheel driving assembly.

A radial arm designated 25 is provided for suspension of a wheel generally indicated as W. One end 26 of the arm 25 fits over and is pivotally carried by an outward extension of the housing 14.

The free end 27 of the arm 25 has a stub axle 28 suitably mounted therein and extending laterally therefrom to engage the hub of one of the wheels W. The inner end of the hub of the wheel W indicated as 29 has mounted on the periphery thereof a sprocket wheel 30. The stub axle 28 is secured in the arm 25 and the hub of the wheel W so as to prevent the said wheel from disengaging therefrom.

A sprocket chain 31 engages the sprocket wheel 24 which is mounted on the shaft 13 and the sprocket wheel 30 mounted on the inner portion of the hub 29 so as to translate the rotary motion of the said sprocket wheels to the ground engaging wheel W.

The arm 25 is pivoted at the shaft 13 so that the wheel can easily rise or fall when obstructions are met without any undue strain upon the various parts. The wheel W is suspended in resilient load by a compression unit P which is suitably carried by a bracket, or the like, mounted on the exterior surface of the frame 2. The unit P is preferably of the air cushioning type and is provided with a piston, the lower end of which is mounted on the radial arm 25 at a point intermediate its ends.

In the housing 14, which is preferably integral with the differential housing 8 and which is supported by a side wall of the frame 2, is disposed distribution gearing which comprises bevel gears 15, 16 and 17.

The bevel gear 15 is fixedly mounted on the shaft 13 for rotation therewith and meshes with the gear 16 which is mounted on the end of an auxiliary driven shaft 16a which is substantially parallel to the drive-shaft 6 and journaled at one end thereof in the housing 14.

The bevel gear 15 also meshes with the gear 17 which is mounted on one end of a second auxiliary shaft 17a which is journaled at one end in the housing 14 and is substantially in co-axial alignment with the shaft 16a.

Brake means 18 are operatively mounted on shafts 16a and 17a intermediate the ends thereof.

The shaft 16a is journaled at its opposite end in wall 19 of a bevel gear housing generally indicated as 20, which is carried by the frame 2. In the housing 20 are disposed bevel gears 21 and 22 which mesh with each other at right angles. The bevel gear 21 is mounted on the end of the shaft 16a and is adapted to rotate therewith.

The bevel gear 22 is mounted on the end of an axle 23 journaled within the housing 20. The axle 23 extends outwardly from the housing 20, and has its longitudinal axis substantially at right angles to the longitudinal axis of the auxiliary shaft 16a. An outward extension of the housing 20 carries the radial arm 25 which supports the rear wheel W'.

The axle 23 extends outwardly through the wall of the frame 2 and has mounted thereon a sprocket wheel 24 which drives the wheel W' through its chain 31 in a manner previously described.

The auxiliary shaft 17a which extends from the housing 14 in coaxial alignment with the shaft 16a and which is driven by the interaction of the bevel gears 15 and 17, is provided with another bevel gear 32 disposed in a bevel gear housing which is generally indicated as 34.

Another bevel gear 36 is disposed within the housing 34 at right angles to and meshing with the bevel gear 32 on a shaft 37 to transmit torque to the forward drive wheel W".

The driving mechanism for each of the wheels W on both sides of the chassis 2 is the same as already described in detail above and it is not thought necessary to describe the driving mechanism for each wheel separately.

The drawings show three pairs of wheels driven in accordance with the driving mechanism above described but it is to be understood that this system of bevel gearing may be extended to include as many more pairs of wheels as is desired.

The steering unit comprises a pair of radial arms 40 pivotally connected to the frame 2 and suspended by compression units P¹ similar to the device P. The free ends of the arms 40 carry the pivoted wheel axles upon which are mounted the steering wheels S. The pivoted wheel axles are connected to steering wheel 41 in any suitable manner, such as through the arms 42 and the links 43.

In operation of the driving mechanism the power means 3 through the clutch 4 and transmission 5 transmits torque to the drive shaft 6. The drive shaft 6 in turn imparts torque to the oppositely disposed shafts 13, at right angles thereto, through the differential gearing 7. The shafts 13 in turn transmit their torque to cause rotation of the middle pair of ground engaging wheels W by means of the sprockets 24 and 30 and the chain 31.

Rotary motion to the rearward and forward wheels W is supplied also from the differentially driven lateral shafts 13. The torque of the shafts 13 is transmitted through the distribution gears 15, 16 and 17 to the shafts 16a and 17a and thence through bevel gears 21, 22 and 32, 36 to the drive shafts 23 and 37 respectively. These shafts then transmit their rotative movement to the wheels as above described through their respective sprockets 24 and 30 and chains 31.

It can thus be seen from this invention that many pairs of wheels can be driven from a single main drive shaft.

It is to be understood that various modifications of this invention will be apparent to those skilled in the art without departing from the scope thereof.

The main concept being to provide a single directly driven shaft having a pair of bevel gears mounted thereon which cooperate with a primary set of bevel gears which in turn cooperate with a secondary set of bevel gears to operate a plurality of wheels efficiently from a single directly driven power shaft.

What I claim and desire to secure as my invention is:

1. In a driving mechanism for a mobile unit, a frame, a pair of directly driven shafts having two bevel gears mounted thereon in spaced relation, a pair of ground wheels carried by said frame and laterally offset from said directly driven shafts, means including sprocket wheels on said shafts and wheels and chains to operatively connect said directly driven shafts to said pair of wheels, a primary set of bevel gears comprising two pairs of bevel gears, each pair in said primary set of bevel gears engaging one of said bevel gears mounted on said directly driven shafts, a secondary set of bevel gears comprising four pairs of bevel gears, each bevel gear in a pair being disposed at right angles to and engaging with the other in the pair, rotatable shafts rigidly mounted on said frame to operatively connect each of the bevel gears in the primary set to one bevel gear in each pair of bevel gears in the secondary set, stub shafts extending from the other of said bevel gears in each pair of gears in the secondary set, a sprocket wheel mounted on each of said stub shafts, a ground wheel laterally offset from each stub shaft and a sprocket wheel mounted on the hub portion thereof, and a sprocket chain operatively connecting the said sprocket wheels.

2. In a vehicle of the character described having a frame provided with substantially parallel side walls, a driving unit comprising a drive shaft, a directly driven shaft having two aligned sections differentially driven by said drive shaft, a central gear housing fixedly mounted on each side of said frame, one section of said directly driven shaft extending transversely of the frame through one of said gear housings and through one side wall of the frame, the other section of said directly driven shaft extending similarly through the other gear housing and the other side wall of the frame, a pair of bevel gear housings fixedly mounted on each side of said frame with one housing forwardly and the other rearwardly of said directly driven shaft, a pair of axially aligned shafts on each side of the frame extending longitudinally of the frame and substantially parallel to the sides thereof, one end of each of said longitudinal shafts extending into the central gear housings and the other ends of said shafts extending into said bevel gear housings, a stub shaft extending from each bevel gear housing transversely of the frame and out through the side wall thereof, bevel gears in said central gear housing connecting said longitudinally extending shafts to said directly driven shaft, bevel gears in said bevel gear housings connecting the longitudinal shafts to said stub shafts, an arm associated with each of the said shafts which extend through the walls of the said frame, said arms being coaxially mounted with respect to said shafts, a ground engaging wheel journalled on the outer extremity of each of the arms, and means for transmitting rotary motion from said last recited shafts to the said ground engaging wheels.

3. In a vehicle of the character described having a frame provided with substantially parallel side walls, a driving unit comprising a drive shaft, a directly driven shaft having two aligned sections differentially driven by said drive shaft, a central gear housing fixedly mounted on each side of said frame, one section of said directly driven shaft extending transversely of the frame through one of said gear housings and through one side wall of the frame, the other section of said directly driven shaft extending similarly through the other gear housing and the other side wall of the frame, a pair of bevel gear housings fixely mounted on each side of said frame with one housing forwardly and the other rearwardly of said directly driven shaft, a pair of axially aligned shafts on each side of the frame extending longitudinally of the frame and substantially parallel to the sides thereof, one end of each of said longitudinal shafts extending into the central gear housings and the other ends of said shafts extending into said bevel gear housings, a stub shaft extending from each bevel gear housing transversely of the frame and out through the side wall thereof, bevel gears in said central gear housing connecting said longitudinally extending shafts to said directly driven shaft, bevel gears in said bevel gear housings connecting the longitudinal shafts to said stub shafts, a ground-engaging wheel associated with each shaft extending through the side walls of said frame, a sprocket mounted exteriorly of said frame on each shaft which projects through the side walls of said frame, a sprocket on each ground wheel, and a chain connecting the sprockets of said associated ground wheels and shafts.

4. In a driving mechanism for a mobile unit, a frame, a pair of directly driven shafts, gears mounted thereon in spaced relation, an arm associated with each of the said shafts which shafts extend through the walls of the said frame, said arms being coaxially mounted with respect to said shafts, a ground engaging wheel journalled on each of the said arms, means for transmitting rotary motion from said shafts to said ground wheels, a primary set of gearing comprising two pairs of gears, each pair in said primary set of gearing engaging one of said gears mounted on said directly driven shafts, a secondary set of gearing comprising four pairs of gears, each gear in a pair being disposed at right angles to and engaging with the other in the pair, rotatable shafts mounted on said frame to operatively connect each of the gears in the primary set to one gear in each pair of gears in the secondary set, stub shafts extending from the other of said gears in each pair of gears in the secondary set, said stub shafts extending through the said frame, an arm associated with each of the said stub shafts, said arms being coaxially mounted with respect to the said stub shafts, a ground engaging wheel carried by each of the last said arms, and means for transmitting rotary motion from said stub shafts to the said ground engaging wheels.

5. In a driving mechanism for a mobile unit, a frame, a pair of driven shafts, said shafts being centrally located with respect to the frame and extending transversely across the frame, an arm associated with each of the shafts, said arms being mounted on the frame and coaxially mounted with respect to the said shafts, a ground engaging wheel mounted on each of the said arms, means for transmitting rotary motion from the said shafts to the said ground engaging wheels, a pair of axially aligned shafts on each side of the frame extending longitudinally of the frame and substantially parallel to the sides thereof, means mounted in spaced relation on the said driven shafts to drive said longitudinally extending shafts, a stub shaft extending from an end of each of the said longitudinally extending shafts transversely of the frame, an arm associated with each of the stub shafts, said arms being coaxially mounted with respect to said stub shafts, a ground engaging wheel supported by each of the last said arms, and means for transmitting rotary motion from said stub shafts to the last said ground engaging wheels.

FLOYD de L. BROWN.